Dec. 12, 1944.   H. J. McLARY   2,364,862
WEED DESTROYING ATTACHMENT FOR PLOWS
Filed June 23, 1943
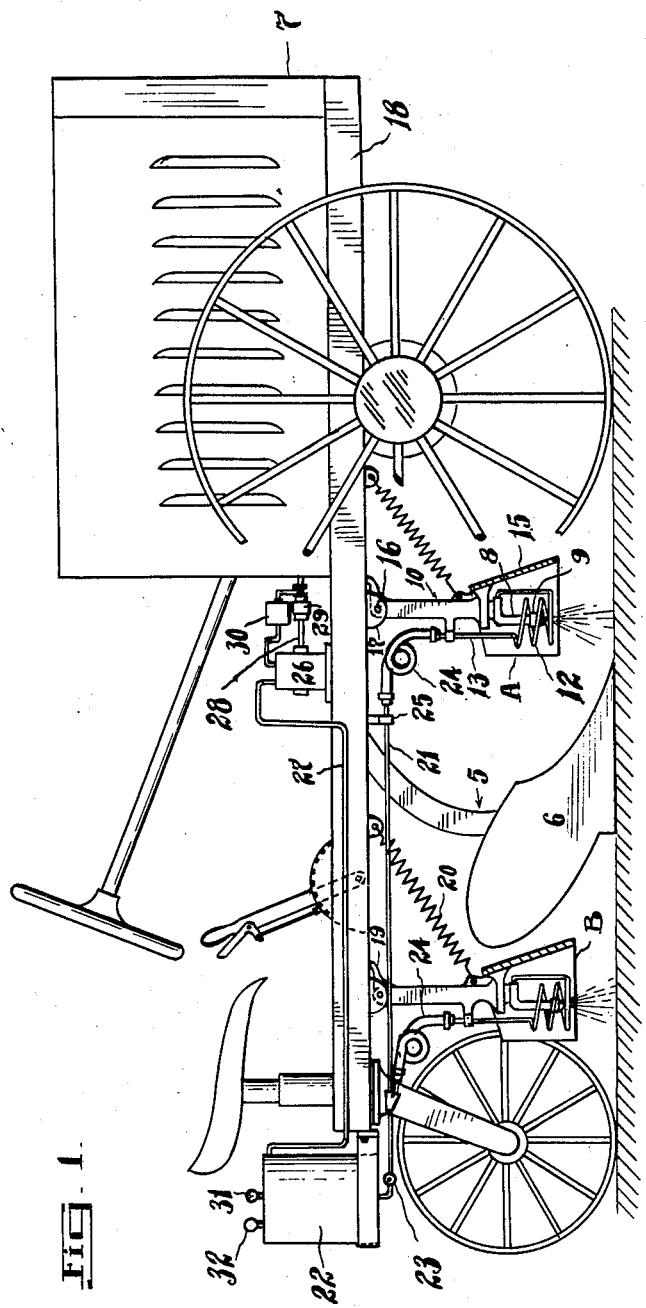
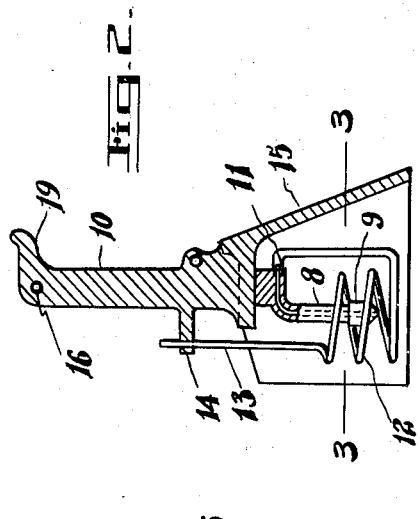
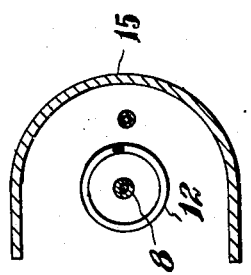
INVENTOR,
H. J. McLARY
By Frederick E. Bromley
ATTY.

Patented Dec. 12, 1944

2,364,862

UNITED STATES PATENT OFFICE 2,364,862

WEED DESTROYING ATTACHMENT FOR PLOWS

Henry James McLary, Orangeville, Ontario, Canada

Application June 23, 1943, Serial No. 491,879
In Canada May 11, 1943

1 Claim. (Cl. 126—271.2)

My invention relates to means for cultivating the soil in the growing of crops, and comprises the provision of burner apparatus for attachment to an agricultural implement, such as a plow.

From experiments I have conducted I have ascertained that a very efficient method of destroying weeds and conditioning soil is to subject the ground to the intense heat of a blow torch while it is being plowed. This completely destroys weeds as they are, uprooted and is particularly efficacious in killing twitch grass which is most difficult to eradicate. Also, it is effective in killing insects and their larvae, and results in a betterment of the soil with the assurance that it is virtually free of weeds and their seeds.

I find that best results are obtained by using a burner at the front of the plow and another at the rear, the front one being arranged to throw a flame directly on the land in close proximity to the point of the plow-share, and the other being arranged to throw a flame on the turned soil of the furrow.

The invention comprehends suitable blow-torch apparatus for treating the soil in the manner above recounted, and comprises suspended burners having downwardly directed nozzles to which hydrocarbon fuel is delivered under high pressure as from a tank in which air pressure is built up by a compressor. The burners desirably have a preheating coil and are protected against injury by encompassing guards. They are yieldably mounted by pivotal arms stressed by springs so as to swing backwardly to clear an obstruction, such as a stone. A distinctive feature of construction is that the burners are devised with a special flexible connection in the fuel line which accommodates their backward motion in riding over an obstruction.

A practical embodiment of the invention is illustrated in the accompanying drawing, in which Figure 1 is a vertical elevation of a unitary tractor and plow having the invention applied thereto.

Fig. 2 is an enlarged detail, chiefly in section, of a swingable burner unit, and Fig. 3 is a cross section on line 3—3 of Fig. 2.

Like numerals of reference indicate corresponding parts throughout the drawing of the invention.

Referring to the drawing, for the purpose of exemplifying the invention there is generally indicated at 5 a plow having a single share 6 and being carried by a power-unit generally denoted at 7. The power-unit may be any type of tractor, and the plow may be carried by it, as shown, or hitched thereto.

In carrying out the invention, the blow-torch apparatus is furnished with duplicate burner-units A and B, one of which is located at the front of the share 6 and the other at the rear thereof. Both burner-units are suspended with their lower ends in suitable proximity to the ground so that a flame from a nozzle thereat will be diffused upon the soil. The rear burner-unit should be closer to the ground than the other and slightly to the land side of the furrow cut by the share in order that the flame may play in and upon the turned soil.

Each burner-unit comprises a downwardly directed nozzle 8 having a tip 9 of a known type which may be of the adjustable kind. The nozzle is attached to an arm 10 and connected at 11 to an end of the preheating coil 12 which encircles the tip 9 so that heat of the flame will vaporize the fuel. The receiving end 13 of the coil is upwardly directed alongside of the arm 10 and rigidly attached thereto as by a clip 14.

The nozzle and the coil are encompassed by a flared shield or guard 15 of a U-shaped cross section, which is shown as integrally formed on the arm, but which might be constructed as a separate unit and detachably secured. Since the bight of the shield is disposed at the front of the arm, the side portions present deflecting surfaces which function to brush aside any small stones or other light-weight obstructions encountered in plowing operations.

The upper end of arm 10 is pivoted at 16 in a bracket 17 attached rigidly to the frame 18 of the tractor. The pivotal connection enables the burner-unit to swing backwardly when the shield 15 encounters a heavy stone or other such obstruction. The arm is fashioned with a stop shoulder 19 or equivalent means so that it cannot swing forwardly, and it is retained in a depending position by the tension of a spring 20.

Fuel is supplied to the burner-unit by a delivery line 21 connected to a tank 22. The line is valve-controlled as at 23, and consists preferably of a rigid piping having at each burner-unit an element 24 designed to accommodate the backward swing thereof. The element may be in the nature of a flexible pig-tail connected to the receiving end 13 of the coil 12. A short length of rubber tube formed into a coil serves the purpose satisfactorily. The rigid piping 21 is anchored to the frame adjacent to element 24, as at 25.

The burner-unit provides a serviceable and efficient structure that will yield to ride over an obstruction in the operation of the machine. The tank 22 holds a supply of fuel oil, which may be of low grade. The fuel is subjected to air pressure as by means of a compressor 26 connected to the tank by a conduit 27. Desirably, power is taken off the tractor-engine to operate the compressor such as by a transmission including a shaft 28 having a clutch 29 or comparable device automatically controlled for the purpose of maintaining a substantially predetermined pressure in the tank. The automatic control for the clutch may be of a known type that is pneumatically actuated. Such a control is indicated at 30 but does not per se form a part of the present invention. The tank will have the usual accoutrement including a pressure gauge 31 and a safety valve 32.

Although the invention is described and shown as applied to a plow having a single share, it will be understood that it is also applicable to gang plows, and that the blow-torch apparatus may be directly mounted on the plow frame.

What I claim is:

A burner of the class described comprising a wheeled frame, a depending arm pivoted at its upper end to said frame for swinging rearwardly thereof, said arm formed with a part extending forwardly of its pivotal axis for engaging said frame to constitute a stop shoulder for limiting forward swing of the arm, a helical tension spring having one end connected to said arm at a point removed from said pivotal axis and the other end connected to said frame forwardly of said axis so as to yieldably retain said arm in its depending position, a nozzle carried by the lower end of said arm and terminating in a downwardly directed tip, a preheating coil encircling said nozzle and having one end connected thereto and the other end upwardly directed rearwardly of said arm and rigidly attached thereto for connection with a source of fuel supply, and a shield disposed about the nozzle and said coil and rigid with said arm.

HENRY JAMES McLARY.